(12) United States Patent
Shiokawa et al.

(10) Patent No.: US 11,577,605 B1
(45) Date of Patent: Feb. 14, 2023

(54) ALL-WHEEL-DRIVE ELECTRIC VEHICLE

(71) Applicant: SUBARU CORPORATION, Tokyo (JP)

(72) Inventors: Hiroaki Shiokawa, Tokyo (JP); Chihiro Oguro, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/846,762

(22) Filed: Jun. 22, 2022

(30) Foreign Application Priority Data

Jul. 21, 2021 (JP) .............................. JP2021-120951

(51) Int. Cl.
*B60L 15/20* (2006.01)
*B60K 23/08* (2006.01)
*B60K 17/356* (2006.01)

(52) U.S. Cl.
CPC ........ *B60K 23/0808* (2013.01); *B60K 17/356* (2013.01); *B60L 15/20* (2013.01); *B60K 2023/0833* (2013.01); *B60L 2240/12* (2013.01); *B60L 2250/28* (2013.01)

(58) Field of Classification Search
CPC .............. B60K 23/0808; B60K 17/356; B60K 2023/0833; B60L 15/20; B60L 2240/12; B60L 2250/28

See application file for complete search history.

(56) References Cited

U.S. PATENT DOCUMENTS

| 10,124,698 | B2 * | 11/2018 | Martin | ................. | B60K 17/356 |
| 11,192,556 | B2 * | 12/2021 | Suzuki | ................. | B60K 17/354 |
| 2013/0173100 | A1 * | 7/2013 | Takagi | ................. | B60L 3/0061 |
| | | | | | 180/65.265 |

FOREIGN PATENT DOCUMENTS

| DE | 102012218295 A1 * | 8/2013 | ............. B60K 6/445 |
| JP | 2012-105482 A | 5/2012 | |

* cited by examiner

*Primary Examiner* — Justin Holmes
(74) *Attorney, Agent, or Firm* — McGinn I.P. Law Group, PLLC.

(57) ABSTRACT

An all-wheel-drive electric vehicle includes one or more front electric motors, one or more rear electric motors, an accelerator sensor, a vehicle speed sensor, and a control unit. The one or more front electric motors are configured to directly drive front wheels. The one or more rear electric motors are configured to directly drive rear wheels. The accelerator sensor is configured to determine an operation amount of an accelerator. The vehicle speed sensor is configured to determine vehicle speed. The control unit is configured to control drive of the one or more front and rear electric motors based on the operation amount of the accelerator and the vehicle speed. The control unit is configured to change an allocation of driving force between the one or more front electric motors and the one or more rear electric motors with a bias toward the rear wheels in a case where the operation amount of the accelerator is increased at or above a predetermined rate in a state in which the vehicle speed is higher than or equal to a predetermined speed.

16 Claims, 4 Drawing Sheets

ALL-WHEEL-DRIVE ELECTRIC VEHICLE

CROSS-REFERENCE TO RELATED APPLICATIONS

The present application claims priority from Japanese Patent Application No. 2021-120951 filed on Jul. 21, 2021, the entire contents of which are hereby incorporated by reference.

BACKGROUND

The disclosure relates to an all-wheel-drive electric vehicle.

Recently, electric vehicles (EVs) powered by electric motors and not emitting exhaust gas are in practical use. For example, such an all-wheel-drive electric vehicle includes a front motor that drives front wheels and a rear motor that drives rear wheels.

Interior permanent magnet (IPM) motors that are compact and operate with a high degree of efficiency are suitably included in such an EV. For example, an IPM motor disclosed in Japanese Unexamined Patent Application Publication No. 2012-105482 includes a rotor incorporating magnets fitted inside an iron core. With a permanent magnet embedded in the rotor, such an IPM motor is suitable for high-speed rotation. The IPM motor can use reluctance torque that acts on a magnetic circuit in such a way as to attract and repel part (projections) of a yoke. The reluctance torque is combined with magnet torque resulting from attraction and repulsion between the permanent magnet and a coil. This enables the IPM motor to produce high output torque.

SUMMARY

An aspect of the disclosure provides all-wheel-drive electric vehicle including one or more front electric motors, one or more rear electric motors, an accelerator sensor, a vehicle speed sensor, and a control unit. The one or more front electric motors are configured to directly drive front wheels. The one or more rear electric motors are configured to directly drive rear wheels. The accelerator sensor is configured to determine an operation amount of an accelerator. The vehicle speed sensor is configured to determine vehicle speed. The control unit is configured to control drive of the one or more front electric motors and the one or more rear electric motors based on the operation amount of the accelerator and the vehicle speed. The control unit is configured to change an allocation of driving force between the one or more front electric motors and the one or more rear electric motors with a bias toward the rear wheels in a case where the operation amount of the accelerator is increased at or above a predetermined rate in a state in which the vehicle speed is higher than or equal to a predetermined speed.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

The output characteristics of electric motors such as IPM motors are known as TN characteristics, which suggest that the output torque of an electronic motor decreases with increasing number of revolutions while the electronic motor runs at rotational speeds not lower than the base rotational speed. Thus, vehicles powered by electric motors directly coupled to wheels might not be able to readily accelerate when the driver steps on the accelerator pedal hard in high-speed ranges in which the electric motors run at high rotational speeds. Such a vehicle has room for improvement in its ability to give a driver a sensation of acceleration.

It is desirable to provide an all-wheel-drive electric vehicle that includes a front electric motor configured to drive front wheels directly and a rear electric motor configured to drive rear wheels directly and that is configured to enable a driver to experience a sensation of acceleration at or above the actual (longitudinal) acceleration of the vehicle when the driver steps on an accelerator pedal in a high-speed range in which the front and rear electric motors each operate with reduced output torque.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
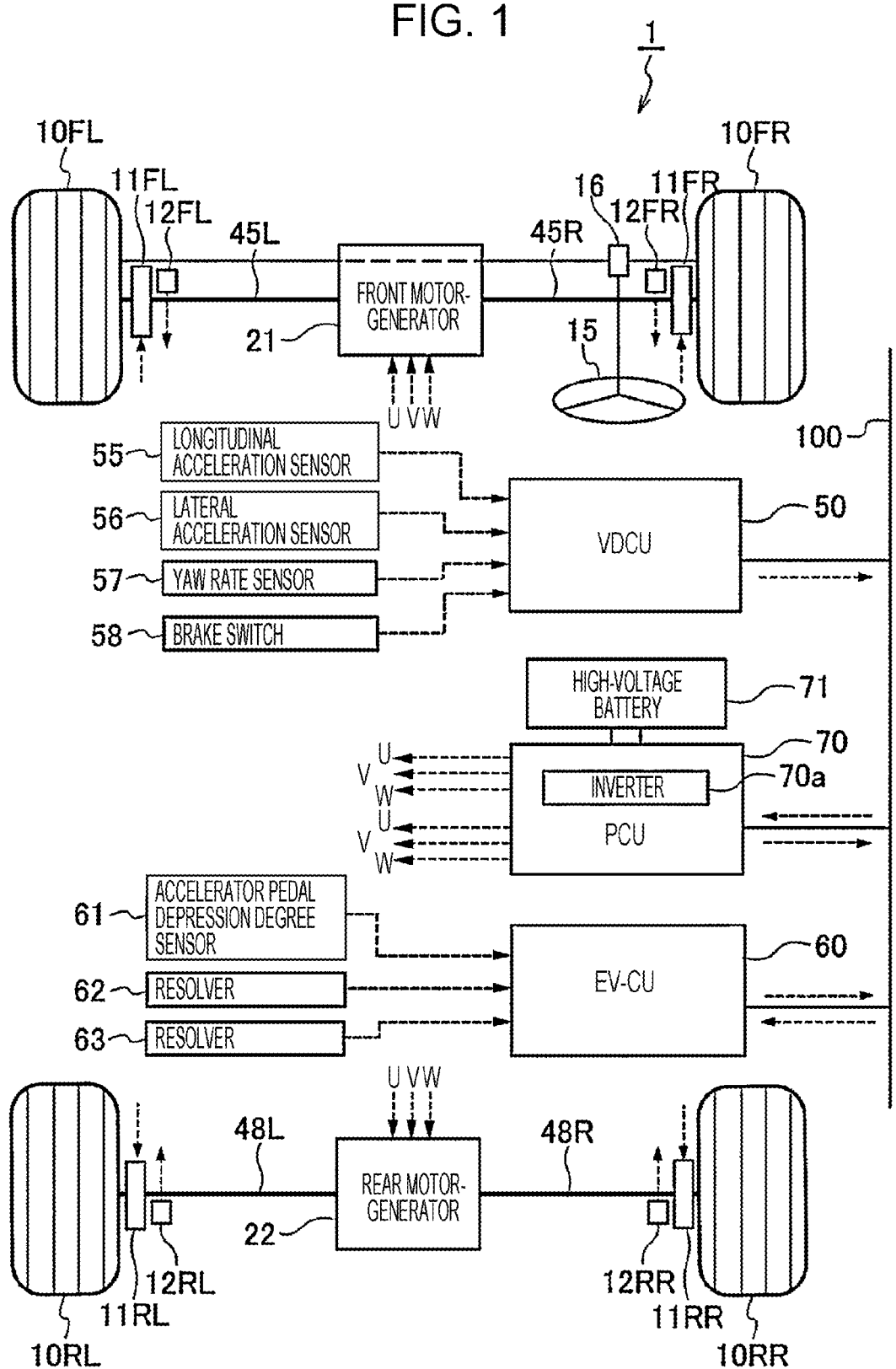
FIG. 1 illustrates an overall configuration of an all-wheel-drive electric vehicle according to an embodiment.

Referring to FIG. 1, the following describes a configuration of an all-wheel-drive electric vehicle (AWD EV) 1 according to an embodiment. FIG. 1 illustrates an overall configuration of the all-wheel-drive electric vehicle 1.

A front motor-generator 21 is coupled to a left front wheel 10FL and to a right front wheel 10FR. A left front-wheel drive shaft 45L forms a connection between the front motor-generator 21 and the left front wheel 10FL to transmit torque to the left front wheel 10FL. A right front-wheel drive shaft 45R forms a connection between the front motor-generator 21 and the right front wheel 10FR to transmit torque to the right front wheel 10FR. The front motor-generator 21 is directly coupled to the front wheels 10FL and 10FR and directly drives the front wheels 10FL and 10FR. In one embodiment, the front motor-generator 21 may serve as a "front electric motor".

The word "directly" is used to describe a state in which the number of revolutions of the front wheels 10FL and 10FR (the vehicle speed) is uniquely determined in accordance with (is in a one-to-one relationship with) the number of revolutions of the front motor-generator 21 without involvement of a transmission mechanism or a clutch. In the present embodiment, the left front-wheel drive shaft 45L and the right front-wheel drive shaft 45R are directly driven by the front motor-generator 21. In some embodiments, the left front-wheel drive shaft 45L and the right front-wheel drive shaft 45R are driven by way of a pair of gears (a reduction gear) having a fixed gear ratio or by way of gears (a reduction gear) and a front differential.

A rear motor-generator 22 is similar to the front motor-generator 21. The rear motor-generator 22 is coupled to a left rear wheel 10RL and to a right rear wheel 10RR. A left rear-wheel drive shaft 48L forms a connection between the rear motor-generator 22 and the left rear wheel 10RL to transmit torque to the left rear wheel 10RL. A right rear-wheel drive shaft 48R forms a connection between the rear motor-generator 22 and the right rear wheel 10RR to transmit torque to the right rear wheel 10RR. The rear motor-generator 22 is directly coupled to the rear wheels 10RL and 10RR and directly drives the rear wheels 10RL and 10RR. The word "directly" may be understood similarly to the meaning mentioned above in relation to the front motor-generator 21. In one embodiment, the rear motor-generator 22 may serve as a "rear electric motor".

The front motor-generator 21 and the rear motor-generator 22 are synchronous motor-generators, each of which functions as both a motor that converts supplied electric power to mechanical power and a generator that converts received mechanical power to electric power. For example, the front motor-generator 21 and the rear motor-generator 22 each function as a motor to generate driving torque while the vehicle is driven. The front motor-generator 21 and the rear motor-generator 22 each function as a generator in the regenerative process.

Figure 2:
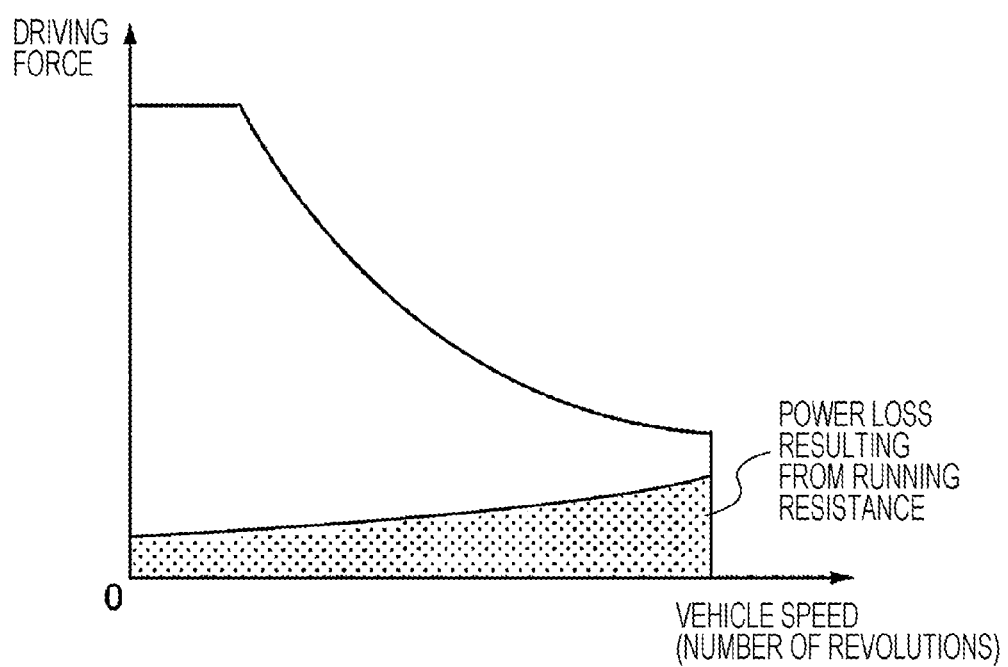
FIG. 2 illustrates the output characteristics (TN characteristics) of a front motor-generator and a rear motor-generator.

FIG. 2 illustrates the output characteristics (TN characteristics) of the front motor-generator 21 and the rear motor-generator 22. In FIG. 2, the horizontal axis represents the vehicle speed (in units of km/h), namely, the number of revolutions of the motor (in units of rpm), and the vertical axis represents the driving force (in units of Nm). The TN characteristics of each of the front motor-generator 21 and the rear motor-generator 22 are as illustrated in FIG. 2; that is, the driving force (output torque) decreases with increasing vehicle speed (with increasing number of revolutions of the motor) while the motor-generator runs at rotational speeds not lower than the base rotational speed. The reason for this is that the induced electromotive force (induced voltage) increases with increasing vehicle speed.

Referring to FIG. 1, the wheels 10FL, 10FR, 10RL, and 10RR, which may also be collectively referred to as wheels 10, are fitted with brakes, each of which is capable of inhibiting motion of the corresponding one of the wheels. The brakes are denoted respectively by 11FL, 11FR, 11RL, and 11RR and may also be collectively referred to as breaks 11. The wheels 10FL, 10FR, 10RL, and 10RR are also fitted with wheel speed sensors, each of which determines the rotational speed of the corresponding one of the wheels. The wheel speed sensors are denoted respectively by 12FL, 12FR, 12RL, and 12RR and may also be collectively referred to as wheel speed sensors 12.

The wheel speed sensors 12 are contactless sensors capable of detecting magnetic field changes caused by rotors (gear rotors or magnet rotors) that rotate together with the wheels 10. For example, magnetic pickups, Hall elements, or magnetoresistive (MR) elements may suitably be used as the wheel speed sensors 12 to detect the changes. The wheel speed sensors 12 are coupled to an EV-CU 60, which will be described later.

In the all-wheel-drive electric vehicle 1 (hereinafter also simply referred to as a "vehicle 1") as described above, the front wheels 10FL and 10FR are directly driven by the front motor-generator 21, and the rear wheels 10RL and 10RR are directly driven by the rear motor-generator 22. The driving force is variably allocated among the front and rear wheels 10 as desired, with a balance between the driving force of the front motor-generator 21 and the driving force of the rear motor-generator 22 being controlled. The front motor-generator 21 and the rear motor-generator 22 may also be used for the regenerative process during braking.

The drive of the front motor-generator 21 and the drive of the rear motor-generator 22 are comprehensively controlled by the EV-CU 60. The EV-CU 60 is coupled to a vehicle dynamics control unit (VDCU) 50 by a controller area network (CAN) 100 in such a manner that the EV-CU 60 and the VDCU 50 can communicate with each other. The EV-CU 60 reduces the possibility of skidding of the vehicle to improve the traveling stability.

The EV-CU 60 and the VDCU 50 each include: a microprocessor configured to perform arithmetic operations; electrically erasable programmable read-only memory (EEPROM) configured to store programs for causing the microprocessor to execute various kinds of processing; random-access memory (RAM) configured to store various kinds of data such as results of arithmetic operations; backup RAM configured to protect the stored data from being lost; and an input-output interface (I/F).

Devices coupled to the VDCU 50 include a steering angle sensor 16, a longitudinal acceleration sensor (longitudinal G sensor) 55, a lateral acceleration sensor (lateral G sensor) 56, a yaw rate sensor 57, and a brake switch 58. The longitudinal acceleration sensor 55 determines the forward or backward acceleration of the vehicle 1, and the lateral acceleration sensor 56 determines the lateral acceleration of the vehicle 1. The steering angle sensor 16 determines the angle of rotation of a pinion shaft to determine the turning angle of steered wheels (the front wheels 10FL and 10FR), that is, the steering angle of a steering wheel 15. The yaw rate sensor 57 determines the yaw rate of the vehicle 1.

The VDCU 50 drives a brake actuator in accordance with the operation amount (depression) of the brake pedal such that brakes are applied to the vehicle. The VDCU 50 receives input from various sensors (e.g., the wheel speed sensors 12, the steering angle sensor 16, the longitudinal acceleration sensor 55, the lateral acceleration sensor 56, and the yaw rate sensor 57) to determine the behavior of the vehicle. The VDCU 50 then effects automatic pressurization to control both the brakes and the torque of the motors in such a way as to reduce the possibility of skidding of the vehicle, which can thus provide enhanced traveling stability during cornering. For example, if the vehicle enters a corner too quickly or the driver jerks the steering wheel aggressively, the vehicle may get out of balance or exhibit erratic behavior, in which case the VDCU 50 prevents or reduces the possibility of skidding and enables the vehicle to travel with high stability.

The VDCU 50 receives, from the sensors, input about the steering angle, the longitudinal acceleration, the lateral acceleration, the yaw rate, and brake application information (braking information) and then transmits them to the EV-CU 60 through the CAN 100.

Various sensors are coupled to the EV-CU 60. Examples of the sensors include an accelerator pedal depression degree sensor 61, a resolver 62, a resolver 63, and the wheel speed sensors 12. The accelerator pedal depression degree sensor 61 determines the amount of depression made on the accelerator pedal (the degree of accelerator pedal depression). In one embodiment, the accelerator pedal depression degree sensor 61 may serve as an "accelerator sensor". The resolver 62 determines the rotational position (the number of revolutions) of the front motor-generator 21. The resolver 63 determines the rotational position (the number of revolutions) of the rear motor-generator 22. Each of the wheel speed sensors 12 determines the speed of the corresponding one of the wheels 10. In one embodiment, each wheel speed sensor 12 may serve as a "vehicle speed sensor".

The EV-CU 60 receives various kinds of information from the VDCU 50 through the CAN 100. Examples of the information include the steering angle, the longitudinal acceleration, the lateral acceleration, the yaw rate, and the brake application information (the braking information).

The EV-CU 60 controls, based on the received information, the drive of the front motor-generator 21 and the drive of the rear motor-generator 22 in a comprehensive manner. The EV-CU 60 specifies the torque demand value (electrical demand) of each of the front motor-generator 21 and the rear motor-generator 22, based on, for example, the degree of accelerator pedal depression (the driving force demanded by the driver), the driving status (e.g., speed) of the vehicle, and the state of charge (SOC) of a high-voltage battery 71 and then outputs the specified values. In one embodiment, the EV-CU 60 may serve as a "control unit".

The EV-CU 60 also adjusts (controls) the output torque of the front motor-generator 21 and the output torque of the rear motor-generator 22 in such a way as to allocate the driving force among the front and rear wheels in accordance with the friction of the front wheels 10FL and 10FR and the rear wheels 10RL and 10RR on a road surface. The EV-CU 60 determines the vertical load acting on the front wheels 10FL and 10FR and the rear wheels 10RL and 10RR, based on the longitudinal acceleration and the lateral acceleration of the vehicle and then estimates, based on the vertical load, the friction of the wheels on a road surface.

The front motor-generator 21 and the rear motor-generator 22 are driven, in accordance with the torque demand value (the electrical demand), by a power control unit (PCU) 70 through the use of an inverter 70a. The direct current flowing through the high-voltage battery 71 is converted into power of three-phase current by the inverter 70a, which then supplies the power to the front motor-generator 21 and the rear motor-generator 22. In the regenerative process, the alternating voltage generated by the front motor-generator 21 and/or the rear motor-generator 22 is converted into direct voltage by the inverter 70a and is then stored in the high-voltage battery 71.

In one example, the EV-CU 60 enables the driver to experience a sensation of acceleration at or above the actual acceleration (longitudinal acceleration) of the vehicle when the driver steps on the accelerator pedal in a high-speed range in which the front motor-generator 21 and the rear motor-generator 22 each operate with reduced output torque. The EV-CU 60 performs this function by causing the microprocessor to execute programs stored in, for example, the EEPROM.

When the operation amount of the accelerator is increased at or above a predetermined rate in a state in which the speed of the vehicle 1 is higher than or equal to a predetermined speed, the EV-CU 60 changes the front-rear allocation of the target amount of driving force with a bias toward the rear wheels.

In one example, when the operation amount of the accelerator is increased at or above the predetermined rate in a state in which the speed of the vehicle 1 is higher than or equal to the predetermined speed, the EV-CU 60 reduces the driving force of the front motor-generator 21 and increases the driving force of the rear motor-generator 22. That is, when the operation amount of the accelerator is increased at or above the predetermined rate in a state in which the speed of the vehicle 1 is higher than or equal to the predetermined speed, the EV-CU 60 may reduce the driving force of the front motor-generator 21 so that the driving force of the front motor-generator 21 becomes smaller than a current driving force of the front motor-generator 21, and the EV-CU 60 may increase the driving force of the rear motor-generator 22 so that the driving force of the rear motor-generator 22 becomes larger than a current driving force of the rear motor-generator 22. The front-rear allocation of the target amount of the current driving force of the front motor-generator 21 and the target amount of the current driving force of the rear motor-generator 22 may be a ratio in normal times (e.g., a ratio of 50:50).

Reducing the driving force of the front motor-generator 21 and increasing the driving force of the rear motor-generator 22 cause pitching with lowering (squatting) of the rear of the vehicle 1. This is similar to the lowering (squatting) of the rear of the vehicle caused by a load transfer during acceleration. The pitching is the moment of rotation about the axis (y-axis) passing through the center of gravity of the vehicle 1 and extending through the vehicle body in the width direction of the vehicle.

In some embodiments, during vehicle pitching, the EV-CU 60 increases the degree of bias toward the rear wheels (the rate of increase in the driving force of the rear motor-generator 22) in proportion to the increase in the operation amount of the accelerator (A degree of accelerator pedal depression).

In some embodiments, the EV-CU 60 increases the degree of bias toward the rear wheels (the rate of increase in the driving force of the rear motor-generator 22) in proportion to the increase in the speed of the vehicle 1 (the vehicle speed).

When the amount of time elapsed from changing the front-rear allocation of the target amount of driving force with a bias toward the rear wheels is more than or equal to a predetermined time period or when the time period over which the target amount of driving force of the rear motor-generator 22 is at or above a predetermined value is more than or equal to a predetermined time period, the EV-CU 60 restores the front-rear allocation of the target amount of driving force to the ratio in normal times (e.g., a ratio of 50:50). In other words, rear-wheel bias control is terminated, and the front-rear allocation is restored to the ratio specified in accordance with, for example, the friction of the front wheels 10FL and 10FR and the rear wheels 10RL and 10RR on a road surface. That is, the EV-CU 60 controls the drive of the front motor-generator 21 and the rear motor-generator 22 (front-rear allocation ratio) in accordance with, for example, the friction of the front and rear wheels 10 on a road surface.

Figure 3:
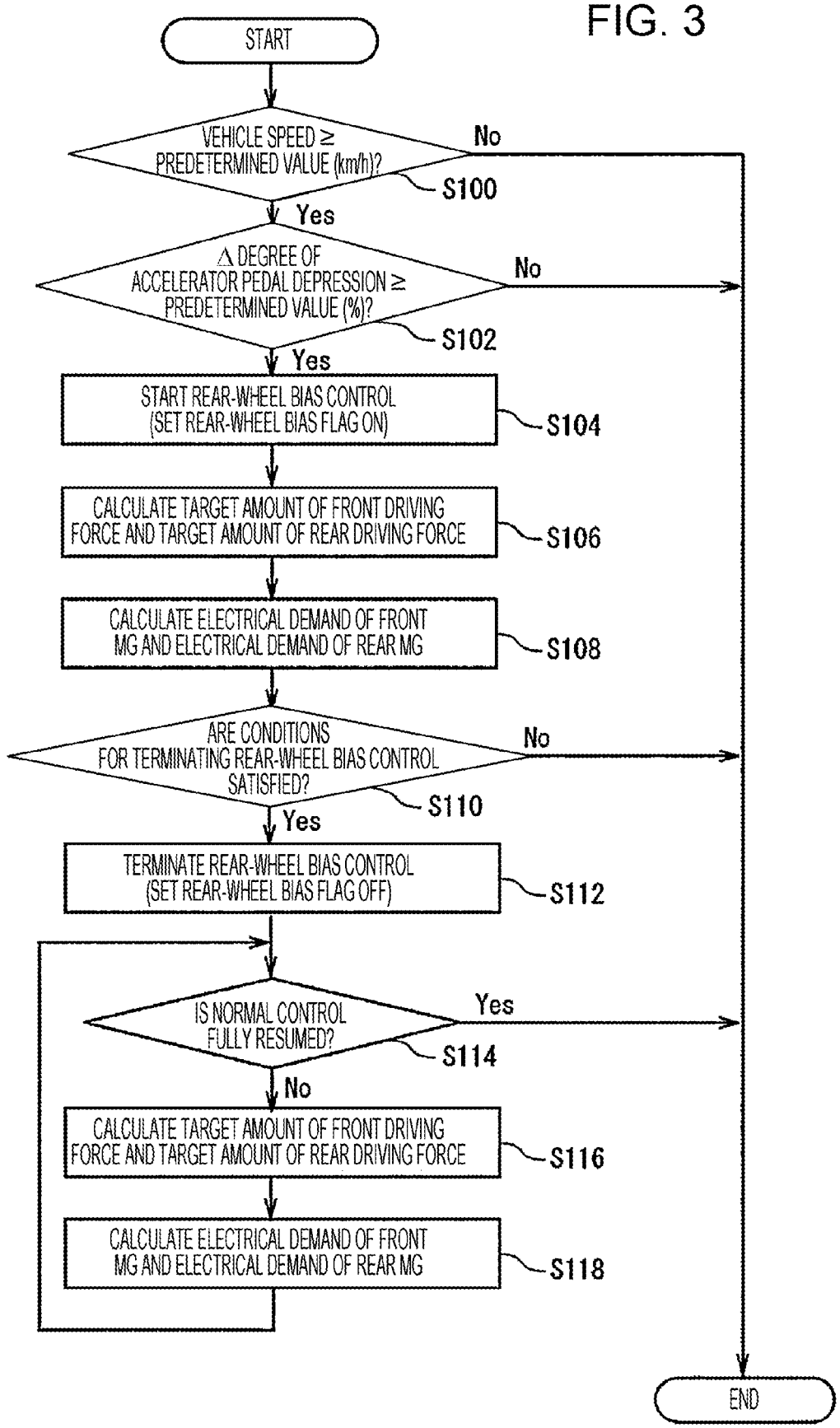
FIG. 3 is a flowchart of the procedure by which the all-wheel-drive electric vehicle according to the embodiment performs rear-wheel bias control (acceleration-sensation creation control)
Figure 4:
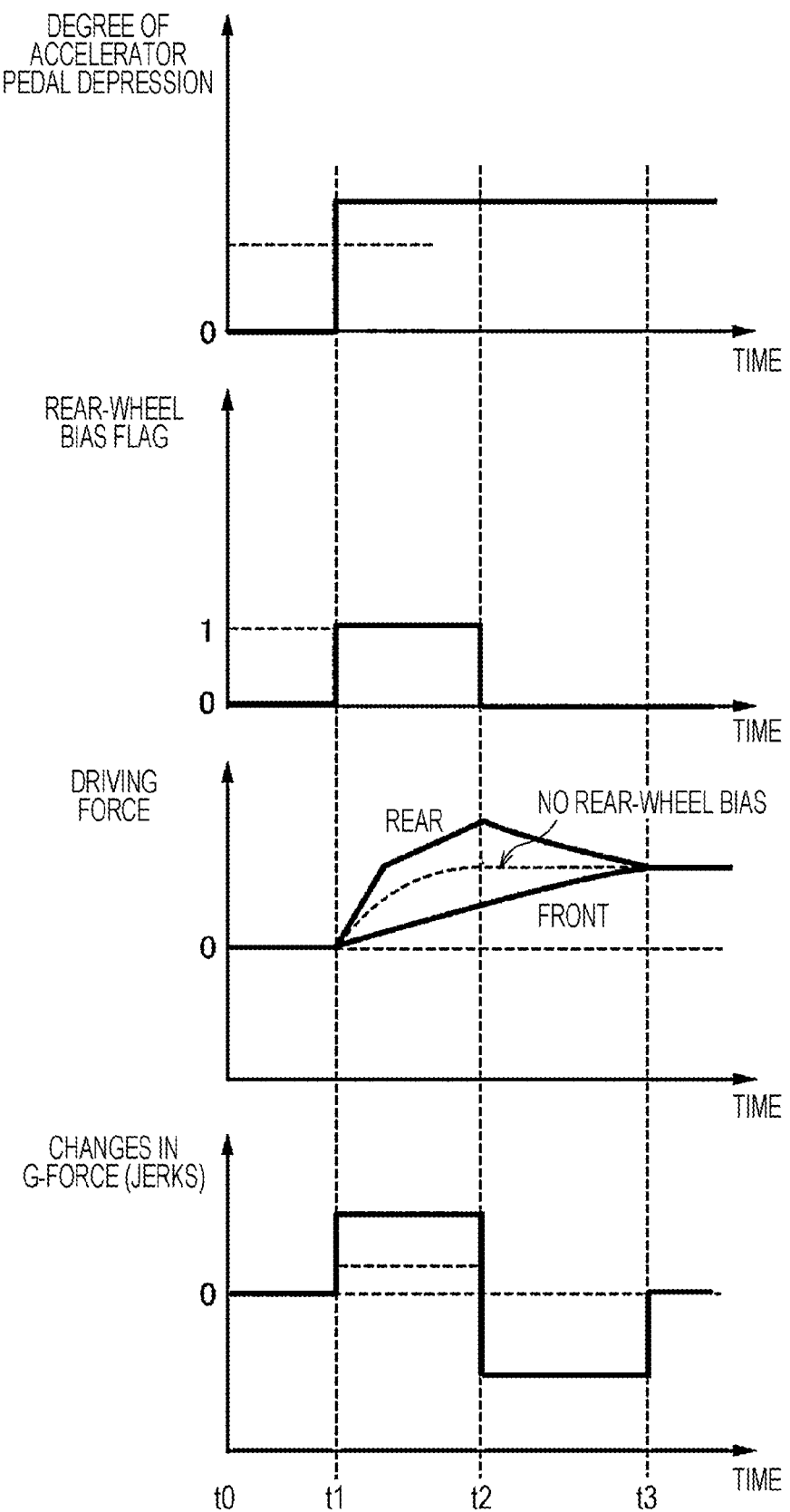
FIG. 4 is a timing chart for the rear-wheel bias control (the acceleration-sensation creation control) performed by the all-wheel-drive electric vehicle according to the embodiment and illustrates changes in the degree of accelerator pedal depression, changes in the driving force of the front motor-generator, changes in the driving force of the rear motor-generator, and changes in G-force (jerks) in the direction of pitching.

The following describes the operation of the all-wheel-drive electric vehicle 1 with reference to FIGS. 3 and 4. FIG. 3 is a flowchart of the procedure by which the all-wheel-drive electric vehicle 1 performs the rear-wheel bias control (acceleration-sensation creation control). This procedure is repeatedly executed mainly by the EV-CU 60 at predetermined timings. FIG. 4 is a timing chart for the rear-wheel bias control (the acceleration-sensation creation control) performed by the all-wheel-drive electric vehicle 1. FIG. 4 illustrates changes in the degree of accelerator pedal depression, changes in the driving force of the front motor-generator, changes in the driving force of the rear motor-generator, and changes in G-force (jerks) in the direction of pitching.

In Step S100, it is determined whether the speed of the vehicle 1 (the vehicle speed) is higher than or equal to a predetermined speed, that is, whether the driving force of the front motor-generator 21 and the driving force of the rear motor-generator 22 are each decreased to or below a predetermined value. The procedure is terminated if the vehicle speed is lower than the predetermined speed. The process proceeds to Step S102 if the vehicle speed is higher than or equal to the predetermined speed.

In Step S102, it is determined whether the increase in the degree of accelerator pedal depression (A degree of accelerator pedal depression) during a predetermined time period is greater than or equal to a predetermined value, that is, whether the degree of accelerator pedal depression is increased at a rate higher than or equal to a predetermined rate. The procedure is terminated if the increase in the degree of accelerator pedal depression is less than the predetermined value. The process proceeds to Step S104 if the increase in the degree of accelerator pedal depression is greater than or equal to the predetermined value (see time t1 in FIG. 4).

In Step S104, a rear-wheel bias flag is set (to 1). The rear-wheel bias flag indicates that the rear-wheel bias control is being executed to change the front-rear allocation of the target amount of driving force with a bias toward the rear wheels. A transition to the state in which the target amount of driving force is allocated among the front and rear wheels with a bias toward the rear wheels is started (see the time t1 in FIG. 4).

Subsequently, in Step S106, the target amount of driving force of the front motor-generator 21 and the target amount of driving force of the rear motor-generator 22 are calculated based on, for example, the speed of the vehicle 1 and the rate of increase in the degree of accelerator pedal depression (A degree of accelerator pedal depression). For example, the target amount of driving force of the front motor-generator 21 is reduced, and the target amount of driving force of the rear motor-generator 22 is increased (see the period from the time t1 to t2 in FIG. 4).

Subsequently, in Step S108, the electrical demand of the front motor-generator 21 and the electrical demand of the rear motor-generator 22 are calculated based on the calculation in Step S106, that is, based on the target amount of driving force of the front motor-generator 21 and the target amount of driving force of the rear motor-generator 22. Then, power is supplied to meet the electrical demand of the front motor-generator 21 and the electrical demand the rear motor-generator 22 such that the front motor-generator 21 and the rear motor-generator 22 are driven (see the period from the time t1 to t2 in FIG. 4). Reducing the driving force of the front motor-generator 21 and increasing the driving force of the rear motor-generator 22 cause pitching (changes in G-force (jerks) in the direction of pitching) with lowering (squatting) of the rear of the vehicle 1 (see the period from the time t1 to t2 in FIG. 4)

Subsequently, in Step S110, it is determined whether requirements for terminating the rear-wheel bias control, which is performed to change the front-rear allocation of the target amount of driving force with a bias toward the rear wheels, are satisfied. For example, determinations are made as to: whether the amount of time elapsed from changing the front-rear allocation of the target amount of driving force with a bias toward the rear wheels is more than or equal to a predetermined time period; whether the time period over which the target amount of driving force of the rear motor-generator 22 is at or above a predetermined value is more than or equal to a predetermined time period; whether skidding of the vehicle 1 is detected; and abnormality in (malfunctioning of) any of the sensors is detected. The procedure is terminated if none of these requirements is satisfied. The process proceeds to Step S112 if at least one of these requirements is satisfied.

In Step S112, the rear-wheel bias flag, which indicates that the rear-wheel bias control is being executed, is reset (to 0). The state in which the target amount of driving force is allocated among the front and rear wheels with a bias toward the rear wheels (the rear-wheel bias control) ends (see at and after the time t2 in FIG. 4).

Subsequently, in Step S114, it is determined whether the normal control is fully resumed after the termination of the rear-wheel bias control, that is, whether the front-rear allocation of the target amount of driving force is restored to the ratio in the normal control (e.g., a ratio of 50:50). The procedure is terminated if the normal control is fully resumed (see at and after time t3 in FIG. 4). The process proceeds to Step S116 if the normal control is yet to be fully resumed.

In Step S116, the target amount of driving force of the front motor-generator 21 and the target amount of driving force of the rear motor-generator 22 are calculated so that the front-rear allocation of the target amount of driving force is gradually back to the ratio in the normal control, that is, the front-rear allocation is gradually close to the ratio dependent on the friction of the front wheels 10FL and 10FR and the rear wheels 10RL and 10RR on a road surface. For example, the target amount of driving force of the front motor-generator 21 is gradually increased, and the target amount of driving force of the rear motor-generator 22 is gradually decreased (see the period from the time t2 to t3 in FIG. 4).

Subsequently, in Step S118, the electrical demand of the front motor-generator 21 and the electrical demand of the rear motor-generator 22 are calculated based on the calculation in Step S116, that is, based on the target amount of driving force of the front motor-generator 21 and the target amount of driving force of the rear motor-generator 22. Then, power is supplied to meet the electrical demand of the front motor-generator 21 and the electrical demand of the rear motor-generator 22 such that the front motor-generator 21 and the rear motor-generator 22 are driven (see the period from the time t2 to t3 in FIG. 4). After that, the process returns to Step S114, and Step S114 and the subsequent steps are repeatedly executed until the normal control is fully resumed.

In the present embodiment, which has been described so far in detail, the front-rear allocation of the target amount of driving force is changed with a bias toward the rear wheels when the operation amount of the accelerator is increased at or above a predetermined rate in a state in which the vehicle speed is higher than or equal to a predetermined speed. For example, the driving force of the front motor-generator 21 is reduced, and the driving force of the rear motor-generator 22 is increased. This causes pitching with lowering (squatting) of the rear of the vehicle 1. In this way, the present embodiment enables the driver to experience a sensation of acceleration at or above the actual acceleration (longitudinal acceleration) of the vehicle when the driver steps on the accelerator pedal in a high-speed range in which the front motor-generator 21 and the rear motor-generator 22 each operate with reduced output torque.

In the present embodiment, the degree of bias toward the rear wheels (the rate of increase in the driving force of the rear motor-generator 22) is increased in proportion to the rise in the rate of increase in the operation amount of the accelerator (A degree of accelerator pedal depression). Thus, the sensation of acceleration (squatting) is increased in proportion to the increase in the operation amount of the accelerator (in proportion to the rise in the acceleration demand from the driver).

In the present embodiment, the degree of bias toward the rear wheels (the rate of increase in the driving force of the rear motor-generator 22) is increased in proportion to the increase in the vehicle speed. This feature enables the driver to experience a sensation of acceleration in a state in which the vehicle speed is further increased, that is, in a state in which the front motor-generator 21 and the rear motor-generator 22 each operate with further reduced output torque.

Although an embodiment of the disclosure has been described so far, the disclosure is not limited to the embodiment above; that is, various alterations may be made. For example, the embodiment is adopted into the all-wheel-drive electric vehicle 1 including the front motor-generator 21 configured to drive the left front wheel 10FL and the right front wheel 10FR and the rear motor-generator 22 configured to drive the left rear wheel 10RL and the right rear wheel 10RR. The embodiment of the disclosure may be adopted into an all-wheel-drive electric vehicle including four wheels provided with the respective in-wheel motors. In the embodiment on the all-wheel-drive electric vehicle, two or more front motor-generators and two or more rear motor-generators may be replaced to the front motor-generator 21 and the rear motor-generator 22 which are mentioned above.

The system configuration of controllers such as the EV-CU 60 and the VDCU 50 and the sharing of functions between these controllers are not limited to those described in the embodiment. The wheel speed sensors 12 in the embodiment is coupled to the EV-CU 60. In some embodiments, the wheel speed sensors 12 are coupled to the VDCU 50, in which case data received by the VDCU 50 may be transmitted to the EV-CU 60 through the CAN 100. Although the EV-CU 60, the PCU 70, and the VDCU 50 in the embodiment are coupled to each other by the CAN 100 in such a manner that the EV-CU 60, the PCU 70, and the VDCU 50 can communicate with each other, any system configuration change (e.g., integration) may be made with consideration given to, for example, functional requirements and costs.

The control unit illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control unit including the VDCU 50 and the EV-CU 60. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. An all-wheel-drive electric vehicle, comprising:
one or more front electric motors configured to directly drive front wheels;
one or more rear electric motors configured to directly drive rear wheels;
an accelerator sensor configured to determine an operation amount of an accelerator;
a vehicle speed sensor configured to determine vehicle speed; and
a control unit configured to control drive of the one or more front electric motors and the one or more rear electric motors based on the operation amount of the accelerator and the vehicle speed, wherein
the control unit is configured to change an allocation of driving force between the one or more front electric motors and the one or more rear electric motors with a bias toward the rear wheels in a case where the operation amount of the accelerator is increased at or above a predetermined rate in a state in which the vehicle speed is higher than or equal to a predetermined speed.

2. The all-wheel-drive electric vehicle according to claim 1, wherein the control unit is configured to decrease driving force of the one or more front electric motors and to increase driving force of the one or more rear electric motors to change the allocation of the driving force with the bias toward the rear wheels in the case the operation amount of the accelerator is increased at or above the predetermined rate in the state in which the vehicle speed is higher than or equal to the predetermined speed.

3. The all-wheel-drive electric vehicle according to claim 1, wherein the control unit is configured to increase a degree of the bias toward the rear wheels in proportion to a rise in a rate of increase in the operation amount of the accelerator.

4. The all-wheel-drive electric vehicle according to claim 2, wherein the control unit is configured to increase a degree of the bias toward the rear wheels in proportion to a rise in a rate of increase in the operation amount of the accelerator.

5. The all-wheel-drive electric vehicle according to claim 1, wherein the control unit is configured to increase a degree of the bias toward the rear wheels in proportion to an increase in the vehicle speed.

6. The all-wheel-drive electric vehicle according to claim 2, wherein the control unit is configured to increase the degree of the bias toward the rear wheels in proportion to an increase in the vehicle speed.

7. The all-wheel-drive electric vehicle according to claim 3, wherein the control unit is configured to increase the degree of the bias toward the rear wheels in proportion to an increase in the vehicle speed.

8. The all-wheel-drive electric vehicle according to claim 4, wherein the control unit is configured to increase the degree of the bias toward the rear wheels in proportion to an increase in the vehicle speed.

9. The all-wheel-drive electric vehicle according to claim 1, wherein the control unit is configured to restore the front-rear allocation of the driving force to a ratio in normal times in a case where an amount of time elapsed from changing the front-rear allocation of the driving force with the bias toward the rear wheels is more than or equal to a predetermined time period or in a case where a time period over which the driving force of the rear electric motor is at or above a predetermined value is more than or equal to a predetermined time period.

10. The all-wheel-drive electric vehicle according to claim 2, wherein the control unit is configured to restore the front-rear allocation of the driving force to a ratio in normal times in a case where an amount of time elapsed from changing the front-rear allocation of the driving force with the bias toward the rear wheels is more than or equal to a predetermined time period or in a case where a time period over which the driving force of the rear electric motor is at or above a predetermined value is more than or equal to a predetermined time period.

11. The all-wheel-drive electric vehicle according to claim 3, wherein the control unit is configured to restore the front-rear allocation of the driving force to a ratio in normal times in a case where an amount of time elapsed from changing the front-rear allocation of the driving force with the bias toward the rear wheels is more than or equal to a predetermined time period or in a case where a time period over which the driving force of the rear electric motor is at or above a predetermined value is more than or equal to a predetermined time period.

12. The all-wheel-drive electric vehicle according to claim 4, wherein the control unit is configured to restore the front-rear allocation of the driving force to a ratio in normal times in a case where an amount of time elapsed from changing the front-rear allocation of the driving force with the bias toward the rear wheels is more than or equal to a predetermined time period or in a case where a time period over which the driving force of the rear electric motor is at or above a predetermined value is more than or equal to a predetermined time period.

13. The all-wheel-drive electric vehicle according to claim 5, wherein the control unit is configured to restore the front-rear allocation of the driving force to a ratio in normal times in a case where an amount of time elapsed from changing the front-rear allocation of the driving force with the bias toward the rear wheels is more than or equal to a predetermined time period or in a case where a time period over which the driving force of the rear electric motor is at or above a predetermined value is more than or equal to a predetermined time period.

14. The all-wheel-drive electric vehicle according to claim 6, wherein the control unit is configured to restore the front-rear allocation of the driving force to a ratio in normal times in a case where an amount of time elapsed from changing the front-rear allocation of the driving force with the bias toward the rear wheels is more than or equal to a predetermined time period or in a case where a time period over which the driving force of the rear electric motor is at or above a predetermined value is more than or equal to a predetermined time period.

15. The all-wheel-drive electric vehicle according to claim 7, wherein the control unit is configured to restore the front-rear allocation of the driving force to a ratio in normal times in a case where an amount of time elapsed from changing the front-rear allocation of the driving force with the bias toward the rear wheels is more than or equal to a predetermined time period or in a case where a time period over which the driving force of the rear electric motor is at or above a predetermined value is more than or equal to a predetermined time period.

16. The all-wheel-drive electric vehicle according to claim 8, wherein the control unit is configured to restore the front-rear allocation of the driving force to a ratio in normal times in a case where an amount of time elapsed from changing the front-rear allocation of the driving force with the bias toward the rear wheels is more than or equal to a predetermined time period or in a case where a time period over which the driving force of the rear electric motor is at or above a predetermined value is more than or equal to a predetermined time period.

\* \* \* \* \*